Patented Apr. 13, 1954

2,675,400

UNITED STATES PATENT OFFICE 2,675,400

MERCURY COMPOUNDS CONTAINING THE CYCLOHEPTATRIEN-1-OL-2-ONE RING

Edward G. Howard, Jr., Wilmington, Del., assignor to E. I. du Pont de Nemours and Company, Wilmington, Del., a corporation of Delaware No Drawing. Application March 10, 1952, Serial No. 275,860

12 Claims. (Cl. 260—431)

This invention relates to new compositions of matter and to methods for their preparation. More particularly this invention relates to a new class of mercury compounds containing a seven-membered carbocyclic ring and to methods for their preparation.

Compounds containing seven-membered rings occur in several natural products. Such compounds in general possess valuable properties with respect to regulating plant growth as well as for pesticidal applications. Of particular interest are carbocyclic compounds and of these the cycloheptatrien-1-ol-2-ones. These compounds have unique chemical properties, e. g., they exhibit many properties which are generally thought of as being primarily associated with aromatic compounds. Organic mercury compounds generally exhibit activity against bacteria and have achieved considerable importance for such uses. New compounds which contain this cycloheptatriene ring system and which also contain mercury should have unusual properties, particularly for physiological uses.

It is an object of this invention to provide new compositions of matter and methods for their preparation. A further object is to provide a new class of compounds containing a seven-membered carbocyclic ring. A still further object is to provide a new class of mercury compounds containing the cycloheptatrien-1-ol-2-one ring. Other objects will appear hereinafter.

The objects of this invention are accomplished by providing a new class of mercury compounds containing the cycloheptatrien-1-ol-2-one ring and having at least one and not more than two of the nuclear carbon atoms of the cycloheptatrien-1-ol-2-one ring attached to a mercury-containing radical —Hg—Y wherein Y is an anion and the remaining nuclear carbon atoms of the cycloheptatrien-1-ol-2-one ring are attached to hydrogen or any substituent whose oxidation potential is less than —.910 volt, such as halogen, particularly of atomic number of 17 to 35, or alkyl of 1 to 3 carbons, nitro, sulfonic or carboxyl groups. The preferred compounds have the general formula

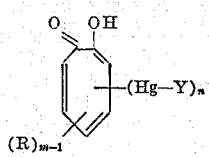

wherein —Hg—Y is a nuclear substituent containing mercury (Hg) with Y being an anion, such as acetoxy, nitrate, sulfate, hydroxyl, or halide, e. g., bromide or chloride, $n$ is a positive integer of 1 to 2, R is any substituent whose oxidation potential is less than —.910 volt and preferably is a halogen of atomic number of 17 to 35 or an alkyl radical of 1 to 3 carbons, and $m$ is a positive integer of 1 to 3.

When $m$ is 1, there is no substituent R and the formula is that of a cycloheptatrien-1-ol-2-one mercury compound which is structurally represented as follows:

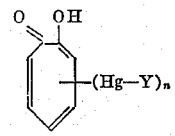

wherein —Hg—Y and $n$ are defined as aforesaid. These new mercury compounds containing the cycloheptatrien-1-ol-2-one ring have been obtained by the reaction of a mercury compound, such as mercuric acetate, with cycloheptatrien-1-ol-2-one or a derivative thereof.

A process for the preparation of the products of this invention involves the reaction of cycloheptatrien-1-ol-2-one or a derivative thereof including those containing halogen or other substituents on the carbocyclic ring with a mercuric salt, such as mercuric acetate.

The following examples in which the parts are by weight further illustrate this invention.

*Example I*

A mixture of 2.44 parts of cycloheptatrien-1-ol-2-one (prepared by the process of Cook et al., Chem. and Ind. 1950, 427) and 6.38 parts of mercuric acetate was heated at 150° C. for five minutes. The viscous product was triturated with distilled water. The yellow powder (6.7 parts) thus obtained was filtered and dried. The powder was dissolved in 10% sodium hydroxide and filtered. To the filtrate was added sufficient concentrated hydrochloric acid to cause slight turbidity and finally acetic acid to precipitate the product. The solid (4 parts) did not melt below 300° C. A qualitative test confirmed the presence of chlorine in the product (chloromercuricycloheptatrien-1-ol-2-one). The analysis was calc'd for $C_7H_5O_2ClHg$: Hg, 56.16%. Found: Hg, 60.60%.

*Example II*

A mixture of 2.01 parts of bromocycloheptatrien-1-ol-2-one (obtained by the process of Cook et al., Chem. and Ind. 1950, 427), and 3.19 parts of mercuric acetate was mixed in a mortar and then heated for 5 minutes at 140° C. There was obtained a dark brown semi-solid mass which was triturated with distilled water giving 4.4 parts of a yellow solid. The solid was dissolved in boiling 5% sodium hydroxide, filtered and acidified with acetic acid after cooling. The solid was filtered, redissolved in cold 5% sodium hydroxide, treated with decolorizing charcoal, acidified and filtered. There was thus obtained one part of bromocycloheptatrien-1-ol-2-one mercuriacetate which had the following analysis:

Cal'd. for $C_9H_7O_4BrHg$: C, 23.51%; H, 1.53%; Br, 17.39%; Hg, 43.64%. Found: C, 24.40%; H, 1.68%; Br, 20.21%; Hg, 41.31%.

Example III

A mixture of 2.44 parts of cycloheptatrien-1-ol-2-one, 6.38 parts of mercuri acetate, and 25 parts of glacial acetic acid was heated for three hours on a steam bath. The clear, dark yellow solution, which gave no precipitate when added to excess alkali, was added to about 250 parts of ether. There was obtained four parts of yellow solid which was purified by dissolving in 20 parts of acetic acid and treating the solution with decolorizing carbon. A fine solid was obtained upon addition of 80 parts of ether. The solid was collected by centrifuging and washed with ether. The product, di(acetoxymercuri)cycloheptatrien-1-ol-2-one had the following analysis:

Calc'd for $C_{11}H_{10}O_6Hg_2$: C, 20.66%; H, 1.58%; Hg, 63.75%. Found: C, 21.22%; H, 1.55%; Hg, 64.17%.

Proof that these mercuric derivatives have mercury-carbon bonds is given by treatment with alkali. Bright yellow solutions result from this treatment. Mercuric oxide would be precipitated if the mercury was bonded to oxygen rather than carbon.

Example IV

A mixture of 1 part of 3,7-dibromocycloheptatrien-1-ol-2-one (Nozoe et al., Proc. Jap. Acad. 27, 21 (1951)) with an excess of mercuriacetate was heated with stirring. The mixture became bright yellow in color and liquefied at 140° C. The mixture was then heated at 170° C. for five minutes at which time the material became pasty. The product thus obtained was cooled and extracted with hot 10% sodium hydroxide. The gray residue thus obtained was sparingly soluble in 10% hydrochloric acid. These reactions show that the residue was not mercuric oxide since it was not orange in color, and was insoluble in alkali. A green color was obtained when a small portion of the gray residue was heated with concentrated hydrochloric acid to which a drop of 5% aqueous ferric chloride was added. This color is characteristic of the cycloheptatrienolone compounds. The presence of mercury in the compound, dibromocycloheptatrien-1-ol-2-one mercuriacetate, was shown by digestion with concentrated nitric acid followed by reaction with hydrogen sulfide.

In place of cycloheptatrien-1-ol-2-one as employed in Examples I and III, other nuclear substitution products can be used. The most suitable and preferred are those which contain an alkyl of 1 to 3 carbons, e. g., as in hinokitiol or thujaplicins, halogens, particularly bromine or chlorine, nitro, sulfonyl or carboxylic groups as substituents on the carbocyclic ring. The position of the substituent on the ring is not important.

For mercuration of the cycloheptatrienolone ring, it is only necessary that the ring have at least two and preferably three positions which have no nuclear substituents, any substituents present being those which do not reduce mercuric mercury, i. e., which do not effect the change of $Hg^{++}$ to $Hg^+$ (which requires $-.910$ volt). Groups which have an oxidation-reduction potential which will produce this change will interfere with the mercurating agent and are to be avoided. On the other hand, groups which do not reduce mercuric mercury, i. e., do not have an oxidation-reduction potential of greater than $-.910$ volt, do not inhibit the mercurating reaction. Examples of the latter type of such groups that can be present on the ring include the carboxyl, sulfonyl, nitro, hydrocarbon, hydroxyl, halide, and ether groups.

The anion attached to the mercuric mercury (which mercuric mercury is also attached by its remaining valence to a nuclear carbon of the cycloheptatrien-1-ol-2-one ring) is generally the anion of an acid, including organic acids such as acetic and propionic, and inorganic acids such as hydrochloric, hydroiodic, nitric, sulfuric, p-toluenesulfonic, etc. The hydroxymercuri (—Hg—OH) compound, such as hydroxymercuricycloheptatrien-1-ol-2-one is produced by the reaction of a base, such as NaOH, with the salt, such as cycloheptatrien-1-ol-2-one mercuriacetate. Addition of acids such as nitric, sulfuric, sulfonic, etc. converts the hydroxymercuri compound into the mercuri-nitrate, mercuri-sulfate, mercuri-sulfonate compound, etc. In general, the anions of lower alkanoic and inorganic acids, particularly those of molecular weight of less than 171, are preferred.

The examples illustrate the preparation of the compounds of this invention which contain one to two mercuric groups, by the use of mercuric acetate. Other mercuric salts can be optionally employed in the preparation of the mercurated cycloheptatrienes of this invention. Suitable mercury derivatives are obtained by treatment of the hydroxymercuri compounds, e. g., as obtained by treatment with alkali followed by treatment with acids, e. g., hydrogen halides, sulfuric acid or nitric acid.

The exact conditions for the mercuration forming reaction depend upon the specific reagents employed. Temperatures of 50 to 150° C. or higher are useful. Inert solvents can be present during the reaction. Satisfactory yields are generally obtained at temperatures of about 100° C. to 150° C. when the time of reaction is at least one minute, and in general, 5 minutes to several hours. Higher temperatures and high molar ratios of the cycloheptatriene promote the formation of insoluble mercury-containing derivatives. The molar ratio present of the mercurating agent, e. g., mercuric acetate, should be at least as high as the ratio on a molar basis of the carbocyclic compound present. The presence of excess mercuric compound favors the production of dimercuric derivatives.

The mercuric derivatives of this invention can be employed in the formation of biologically active products. The mercuric group is susceptible to further reactions under selected conditions and the compounds may be used as chemical intermediates. These derivatives possess the unusual stability or "aromatic character" of the parent carbocyclic compound. The compounds of this invention are of particular use in the formulation of pesticidal and fungicidal materials.

As many apparently widely different embodiments of this invention may be made without departing from the spirit and scope thereof, it is to be understood that this invention is not limited to the specific embodiments thereof except as defined in the appended claims.

I claim:

1. A mercury compound containing the cycloheptatrien-1-ol-2-one ring and having at least one and not more than two of the nuclear carbon atoms of the cycloheptatrien-1-ol-2-one ring attached to a mercury-containing radical —Hg—Y wherein Y is an anion, the remaining nuclear carbon atoms of the cycloheptatrien-1-ol-2-one ring are attached to members selected from the class consisting of hydrogen and substituents having an oxidation potential less than −.910 volt, and not more than two of the nuclear carbon atoms of the cycloheptatrien-1-ol-2-one ring are attached to said substituents having an oxidation potential less than −.910 volt.

2. A mercury compound containing the cycloheptatrien-1-ol-2-one ring and having at least one and not more than two of the nuclear carbon atoms of the cycloheptatrien-1-ol-2-one ring attached to a mercury-containing radical —Hg—Y wherein Y is an anion, at least one and not more than two of the nuclear carbon atoms of the cycloheptatrien-1-ol-2-one ring are attached to substituents having an oxidation potential less than −.910 volts and the remaining nuclear carbon atoms of the cycloheptatrien-1-ol-2-one ring are attached to hydrogen.

3. A mercury compound containing the cycloheptatrien-1-ol-2-one ring and having at least one and not more than two of the nuclear carbon atoms of the cycloheptatrien-1-ol-2-one ring attached to a mercury-containing radical —Hg—Y wherein Y is an anion, at least one and not more than two of the nuclear carbon atoms of the cycloheptatrien-1-ol-2-one ring are attached to halogen of atomic number 17 to 35 and the remaining nuclear carbon atoms of the cycloheptatrien-1-ol-2-one ring are attached to hydrogen.

4. A mercury compound containing the cycloheptatrien-1-ol-2-one ring and having at least one and not more than two of the nuclear carbon atoms of the cycloheptatrien-1-ol-2-one ring attached to a mercury-containing radical —Hg—Y wherein Y is an anion and the remaining nuclear carbon atoms of the cycloheptatrien-1-ol-2-one ring are attached to hydrogen.

5. A mercury compound containing the cycloheptatrien-1-ol-2-one ring and having at least one and not more than two of the nuclear carbon atoms of the cycloheptatrien-1-ol-2-one ring attached to a mercury-containing radical —Hg—Y wherein Y is chlorine and the remaining nuclear carbon atoms of the cycloheptatrien-1-ol-2-one ring are attached to hydrogen.

6. A mercury compound containing the cycloheptatrien-1-ol-2-one ring and having at least one and not more than two of the nuclear carbon atoms of the cycloheptatrien-1-ol-2-one ring attached to a mercury-containing radical —Hg—Y wherein Y is acetoxy, at least one and not more than two of the nuclear carbon atoms of the cycloheptatrien-1-ol-2-one ring are attached to halogen of atomic number 17 to 35 and the remaining nuclear carbon atoms of the cycloheptatrien-1-ol-2-one ring are attached to hydrogen.

7. A mercury compound containing the cycloheptatrien-1-ol-2-one ring and having at least one and not more than two of the nuclear carbon atoms of the cycloheptatrien-1-ol-2-one ring attached to a mercury-containing radical —Hg—Y wherein Y is acetoxy and the remaining nuclear carbon atoms of the cycloheptatrien-1-ol-2-one ring are attached to hydrogen.

8. Chloromercuricycloheptatrien-1-ol-2-one.

9. Bromocycloheptatrien-1-ol-2-one mercuriacetate.

10. Di(acetoxymercuri)cycloheptatrien-1-ol-2-one.

11. Dibromocycloheptatrien-1-ol-2-one mercuriacetate.

12. Hydroxymercuricycloheptatrien-1-ol-2-one.

References Cited in the file of this patent

Chem. Ab., vol. 41, page 4731 (1947).

Erdtman et al. Acta Chemica Scandinavica, pages 625–38 (1949).

Whitmare, Organic Compounds of Mercury, pages 34–35 (1921). The Chemical Catalog Co., New York city.